United States Patent
Lee et al.

(10) Patent No.: US 10,816,756 B2
(45) Date of Patent: Oct. 27, 2020

(54) CAMERA MODULE

(71) Applicant: SAMSUNG ELECTRO-MECHANICS CO., LTD., Suwon-si (KR)

(72) Inventors: Jae Sun Lee, Suwon-si (KR); Chul Wan Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 216 days.

(21) Appl. No.: 15/904,001

(22) Filed: Feb. 23, 2018

(65) Prior Publication Data

US 2018/0364450 A1    Dec. 20, 2018

(30) Foreign Application Priority Data

Jun. 16, 2017    (KR) ........................ 10-2017-0076729

(51) Int. Cl.
*G02B 7/18*    (2006.01)
*G02B 7/02*    (2006.01)
(Continued)

(52) U.S. Cl.
CPC .............. *G02B 7/18* (2013.01); *G02B 7/003* (2013.01); *G02B 7/021* (2013.01); *G02B 7/09* (2013.01);
(Continued)

(58) Field of Classification Search
None
See application file for complete search history.

(56) References Cited

U.S. PATENT DOCUMENTS 8,514,301 B2    8/2013 Zaifrani et al.
9,020,334 B1    4/2015 Suzuka
(Continued)

FOREIGN PATENT DOCUMENTS

CN    101153950 A    4/2008
CN    102103321 A    6/2011
(Continued)

OTHER PUBLICATIONS

Korean Office Action dated Oct. 29, 2018 in corresponding Korean Patent Application No. 10-2017-0076729 (7 pages in English and 6 pages in Korean).
(Continued)

*Primary Examiner* — William B Perkey
(74) *Attorney, Agent, or Firm* — NSIP Law

(57) ABSTRACT

A camera module includes a housing having an internal space, a reflecting module including a reflecting member on a movable holder movably supported by an inner wall of the housing in the internal space, and a lens module disposed behind the reflecting module in the internal space, and including lenses aligned in an optical axis direction so that light reflected by the reflecting member is incident thereto. The movable holder is configured to move the reflecting member in a first axis direction approximately perpendicular to the optical axis direction and a second axis direction approximately perpendicular to the optical axis direction and the first axis direction with respect to the housing. The lens module includes at least two lens barrels disposed on sidewalls of the housing, linearly movable in approximately the optical axis direction, and including the lenses divided and disposed therein.

21 Claims, 16 Drawing Sheets

(51) Int. Cl.
*G02B 7/00* (2006.01)
*G02B 7/09* (2006.01)
*H04N 5/232* (2006.01)
*H04N 5/225* (2006.01)

(52) U.S. Cl.
CPC ......... *H04N 5/2252* (2013.01); *H04N 5/2254* (2013.01); *H04N 5/23248* (2013.01); *H04N 5/23287* (2013.01); *H04N 5/23296* (2013.01)

(56) References Cited

U.S. PATENT DOCUMENTS

| | | | |
|---|---|---|---|
| 9,392,188 | B2 | 7/2016 | Shabtay et al. |
| 2008/0084620 | A1 | 4/2008 | Lee et al. |
| 2008/0291543 | A1 | 11/2008 | Nomura et al. |
| 2015/0042870 | A1 | 2/2015 | Chan et al. |
| 2015/0109485 | A1* | 4/2015 | Ozaki ............... G02B 13/0065 348/240.3 |
| 2015/0215542 | A1 | 7/2015 | Nomura et al. |
| 2017/0108705 | A1 | 4/2017 | Yu et al. |
| 2017/0294476 | A1* | 10/2017 | Hu .................... H01L 27/14683 |
| 2018/0224665 | A1* | 8/2018 | Im ........................ G02B 27/646 |
| 2018/0364450 | A1* | 12/2018 | Lee .......................... G02B 7/18 |

FOREIGN PATENT DOCUMENTS

| | | |
|---|---|---|
| CN | 102422627 A | 4/2012 |
| CN | 203136024 U | 8/2013 |
| CN | 103676405 A | 3/2014 |
| JP | 2011-81426 A | 4/2011 |
| JP | 2015-079229 A | 4/2015 |
| KR | 10-2009-0103958 A | 10/2009 |
| KR | 10-2010-0052842 A | 5/2010 |
| KR | 10-2010-0125978 A | 12/2010 |
| KR | 10-1292693 B1 | 8/2013 |
| KR | 10-2015-0091017 A | 8/2015 |
| KR | 10-2016-0042066 A | 4/2016 |
| KR | 10-2017-0045978 A | 4/2017 |
| WO | WO 2008/090561 A2 | 7/2008 |
| WO | WO 2010/108041 A1 | 9/2010 |
| WO | WO 2015/021279 A1 | 2/2015 |
| WO | WO 2016/207754 A1 | 12/2016 |

OTHER PUBLICATIONS

Korean Office Action dated May 28, 2019 in corresponding Korean Patent Application No. 10-2017-0076729 (5 pages in English and 5 pages in Korean).

Chinese Office Action dated Mar. 23, 2020 in counterpart Chinese Patent Application No. 2018104779662 (18 pages in English and 14 pages in Chinese).

Korean Office Action dated Aug. 20, 2020 in counterpart Korean Patent Application No. 10-2020-0009967 (8 pages in English and 6 pages in Korean).

* cited by examiner

CAMERA MODULE

CROSS-REFERENCE TO RELATED APPLICATIONS

This application claims the benefit under 35 USC 119(a) of Korean Patent Application No. 10-2017-0076729 filed on Jun. 16, 2017, in the Korean Intellectual Property Office, the entire disclosure of which is incorporated herein by reference for all purposes.

BACKGROUND

1. Field

This application relates to a camera module.

2. Description of the Background

Recently, camera modules have become standard in portable electronic devices such as mobile terminals, tablet personal computers, laptop computers, and the like, as well as in smartphones. An autofocusing (AF) function, an optical image stabilization (OIS) function, a zoom function, and the like, have also recently been added to camera modules provided in portable electronic devices.

However, in order to implement various functions, structures of camera modules have become relatively complicated and sizes thereof have increased, resulting in an increase in size of portable electronic devices in which such camera modules are mounted.

In addition, when a lens or an image sensor is directly moved for the purpose of OIS, both a weight of the lens or of the image sensor, and weights of other members to which the lens or the image sensor is attached may be considered. Thus, a predetermined level or more of driving force may be required to provide OIS, resulting in intensified power consumption.

In addition, in order to implement the AF function and the zoom function, a predetermined length or more should be secured in the camera module in an optical axis direction. However, it may be difficult to implement a structure to accommodate such a length due to a size of the camera module.

The above information disclosed in this Background section is only for enhancement of understanding of the background of the disclosure and therefore it may contain information that does not form any part of the prior art nor what the prior art may suggest to a person of ordinary skill in the art.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect a camera module includes a housing having an internal space, a reflecting module including a reflecting member disposed on a movable holder movably supported by an inner wall of the housing disposed in the internal space, and a lens module disposed behind the reflecting module in the internal space, and including lenses aligned in an optical axis direction so that light reflected by the reflecting member is incident thereto. The movable holder is configured to move the reflecting member in a first axis direction approximately perpendicular to the optical axis direction and a second axis direction, approximately perpendicular to the optical axis direction and the first axis direction with respect to the housing. The lens module includes at least two lens barrels disposed on sidewalls of the housing, linearly movable, in approximately the optical axis direction, and including the lenses divided and disposed therein.

The at least two lens barrels may include a first lens barrel and a second lens barrel sequentially disposed in the optical axis direction.

At least one lens in the first lens barrel and at least one lens in the second lens barrel may be aligned approximately in parallel with each other in the optical axis direction.

A first ball bearing may be disposed between the housing and a side surface of the first lens barrels, and a second ball bearing may be disposed between the housing and a side surface of the second lens barrel.

The first and second lens barrels may include respective first and second magnets configured to react to coils provided on the housing configured to generate driving force in the optical axis direction.

A first pulling yoke may be disposed on a sidewall of the housing configured to support the first lens barrel by attractive force between the first pulling yoke and the first magnet, and a second pulling yoke may be disposed on an opposite sidewall of the housing configured to support the second lens barrel by attractive force between the second pulling yoke and the second magnet.

The camera module may further include first and second guide grooves in which the first and second ball bearings are seated, respectively, disposed in the sidewalls of the housing and the side surfaces of the first and second lens barrels facing each other.

A portion of the first and second guide grooves may be elongated in the optical axis direction.

The first magnet may be disposed between first ball bearings in the optical axis direction, and the second magnet may be disposed between second ball bearings in the optical axis direction.

The first and second lens barrels may be approximately the same length as each other in the optical axis direction.

The first and second lens barrels may each include a lens seating portion and an extending portion extending in the optical axis direction.

The first and second lens barrels may each include ball bearings disposed in the lens seating portions and the extending portions.

The first and second lens barrels may each include a magnet disposed in approximately central portions thereof in the optical axis direction.

The lens seating portion of the first lens barrel and the extending portion of the second lens barrel may be disposed overlapping each other in the optical axis direction.

The lens seating portion of the second lens barrel and the extending portion of the first lens barrel may be disposed overlapping each other in the optical axis direction.

At least a portion of the lens barrels may be configured to selectively implement an autofocusing (AF) function and a zoom function or combine with each other to implement the AF function and the zoom function.

In another general aspect, a camera module includes a reflecting member disposed in an internal space of a housing, wherein the reflecting member is configured to rotate about first and second axes approximately perpendicular to an optical axis direction, and the reflecting member is configured to reflect light to the optical axis direction, and a lens module disposed in the internal space of the housing, wherein the lens module includes lenses aligned in the optical axis direction configured to receive the reflected light and be movable in the optical axis direction.

The camera module may further include a rotating plate disposed in the internal space on a sidewall of the housing and configured to rotate about the first axis relative to the sidewall, and a movable holder disposed on the rotating plate in the internal space and configured to rotate about the second axis relative to the rotating plate, wherein the reflecting member may be disposed on the movable holder.

The lens module may include a first lens barrel disposed in the internal space on a sidewall of the housing configured to move in the optical axis direction, and a second lens barrel disposed in the internal space on an opposite sidewall of the housing configured to move in the optical axis direction, wherein a first portion of the lenses may be disposed in the first lens barrel and a second portion of the lenses may be disposed in the second lens barrel.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

It will be understood that when an element or layer is referred to as being "on", "connected to", or "coupled to" another element or layer, it can be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present.

An aspect of this application may provide a camera module having a simple structure and a reduced size while implementing an autofocusing (AF) function, a zoom function, and an optical image stabilization (OIS) function.

An aspect of this application may also provide a camera module in which power consumption may be significantly reduced.

Figure 1:
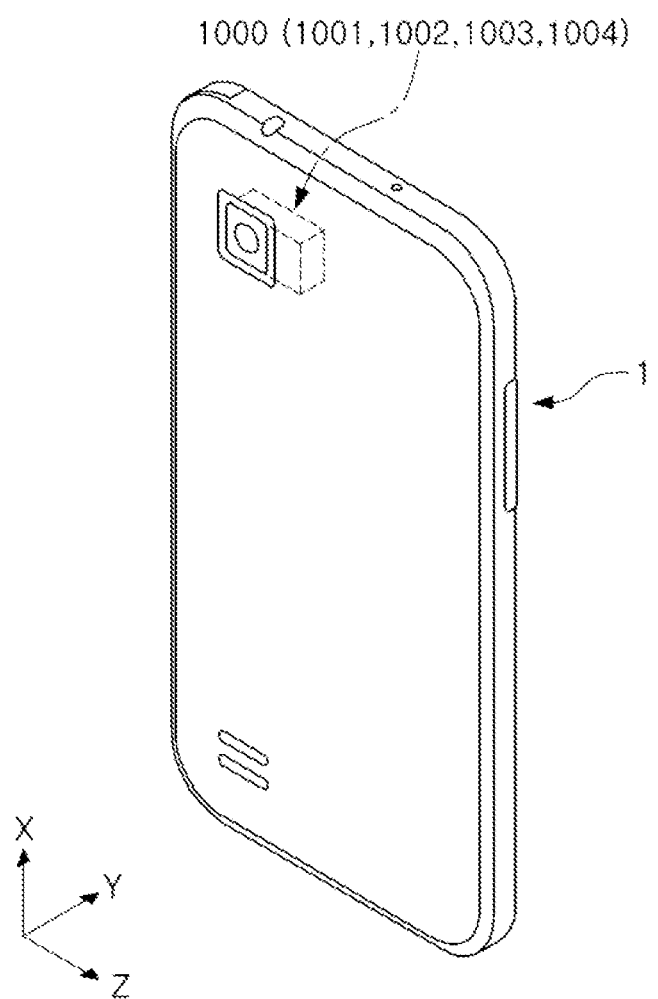
FIG. 1 is a perspective view illustrating a first example of a portable electronic device.

FIG. 1 is a perspective view illustrating a first example of a portable electronic device.

Referring to FIG. 1, the portable electronic device 1 may be a mobile communications terminal, a smartphone, a tablet personal computer, or the like, in which a camera module 1000 (1001, 1002, 1003, or 1004) is mounted.

As illustrated in FIG. 1, the portable electronic device 1 includes the camera module 1000 to capture an image of a subject.

In the present example, the camera module 1000 includes lenses, and an optical axis of each of the lenses is disposed in a direction (Z-axis direction) perpendicular to a thickness direction of the portable electronic device 1 (Y-axis direction or a direction from a major front surface of the portable electronic device 1 to a major rear surface thereof).

As an example, the optical axis of each of the lenses included in the camera module 1000 are disposed in a width direction (the Z-axis direction) or a length direction (X-axis direction) of the portable electronic device 1.

Therefore, even though the camera module 1000 has functions such as an AF function, a zoom function, an OIS function, and the like, a thickness of the portable electronic device 1 is not increased. Therefore, the portable electronic device 1 may be miniaturized.

The example of the camera module 1000 has the AF function, the zoom function, and the OIS function.

Since the camera module 1000 including the AF function, the zoom function, the OIS function, and the like, needs to include various components to implement these functions, a size of the camera module may be increased as compared to a general camera module without these functions.

When the size of the camera module 1000 is increased, a problem may occur in miniaturizing the portable electronic device 1 in which the camera module 1000 is mounted.

For example, when a number of stacked lenses in the camera module is increased for the purpose of the zoom function and the lenses are stacked in the camera module in the thickness direction of the portable electronic device, the thickness of the portable electronic device may also be increased, depending on the number of stacked lenses. That is, when the thickness of the portable electronic device is not increased, the number of stacked lenses may not be sufficient, such that zoom performance may be deteriorated.

In addition, an actuator to move lens groups in an optical axis direction or a direction perpendicular to the optical axis included to implement the AF function and the OIS function when the optical axes of the lens groups are formed in the thickness direction of the portable electronic device, also is installed in the thickness direction of the portable electronic device. Therefore, a thickness of the portable electronic device may be further increased.

However, in the example camera module 1000 according to the present disclosure, the optical axes of the lenses are disposed perpendicularly to the thickness direction of the portable electronic device 1. Therefore, even in the case of the camera module 1000 having the AF, zoom, and OIS functions mounted in the portable electronic device 1, the portable electronic device 1 is miniaturized.

Figure 2:
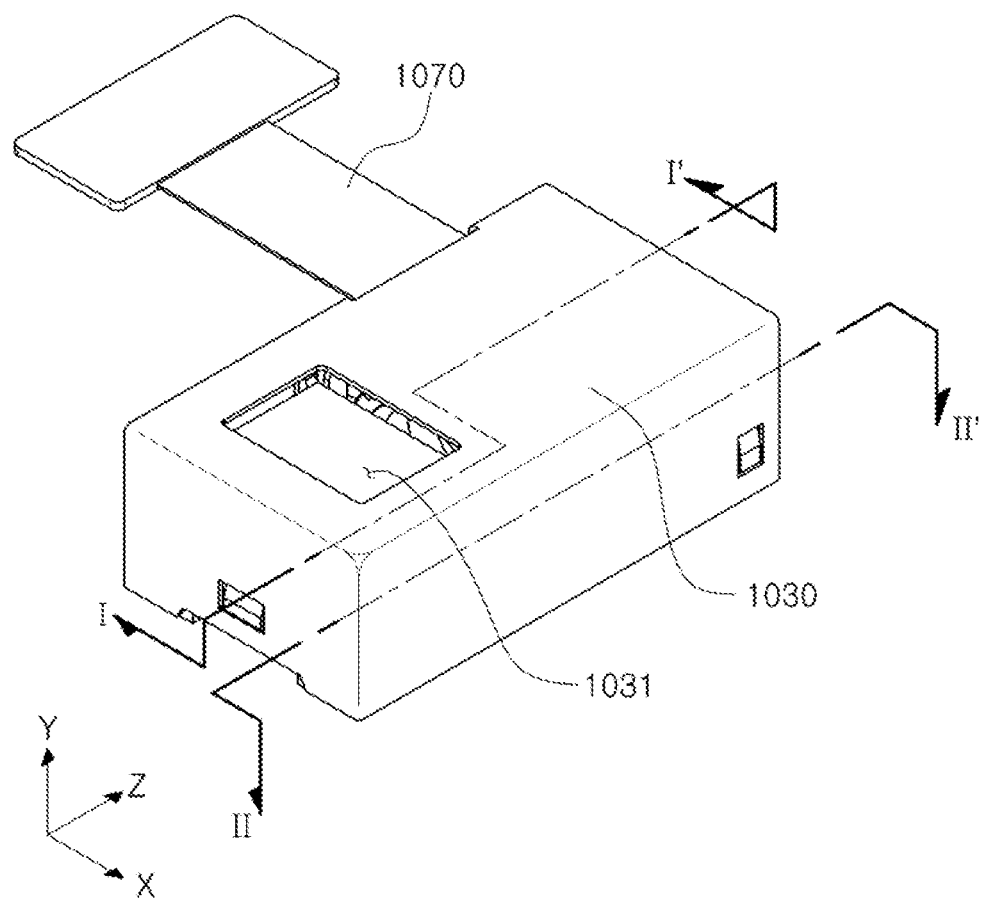
FIG. 2 is a perspective view illustrating an example of a camera module.
Figure 3A:
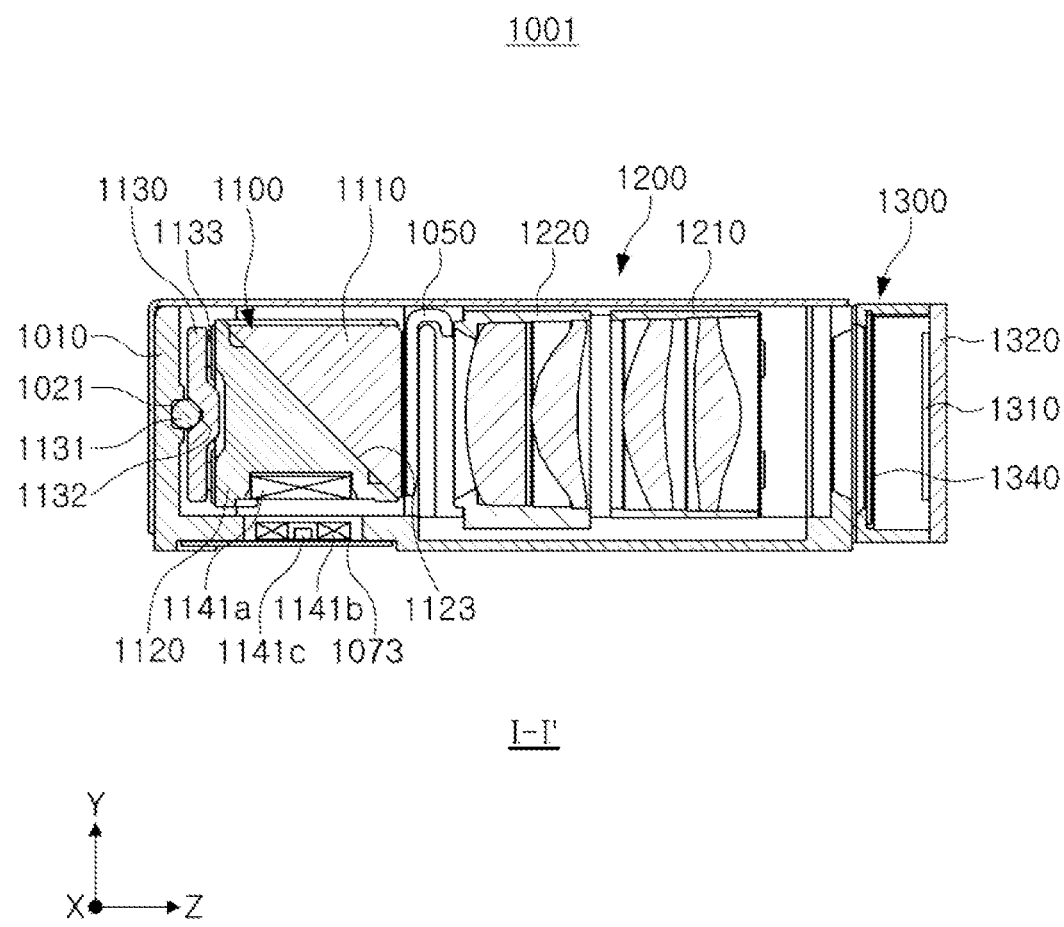
FIGS. 3A and 3B are cross-sectional views illustrating a first example of the camera module of FIG. 2 along lines I-I' and II-II', respectively.
Figure 3B:
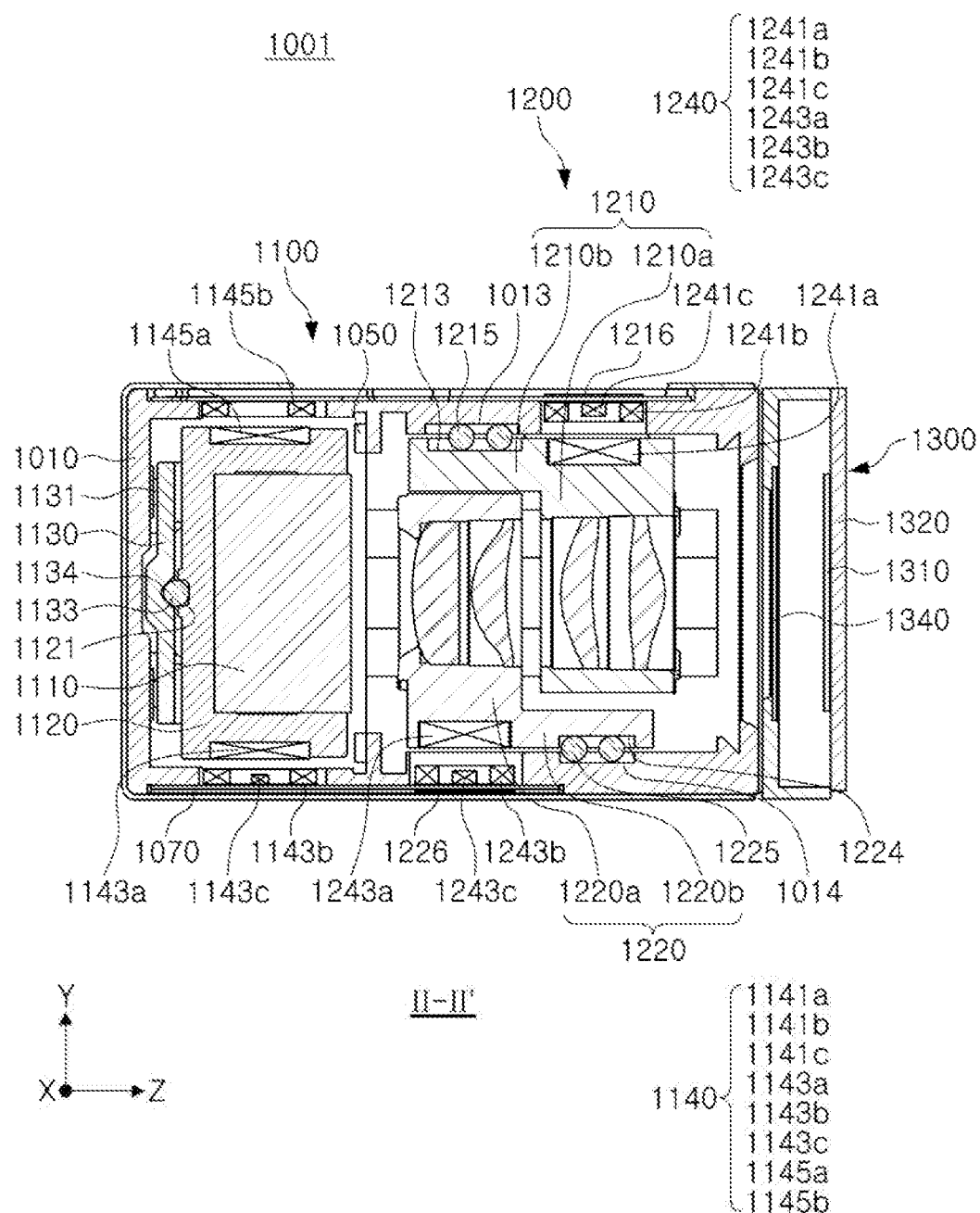

FIG. 2 is a perspective view illustrating an example of a camera module according to the present disclosure. FIGS. 3A and 3B are cross-sectional views along lines I-I' and II-II', respectively, and FIG. 4 is an exploded perspective view of the first example of the camera module of FIG. 2.

Figure 4:
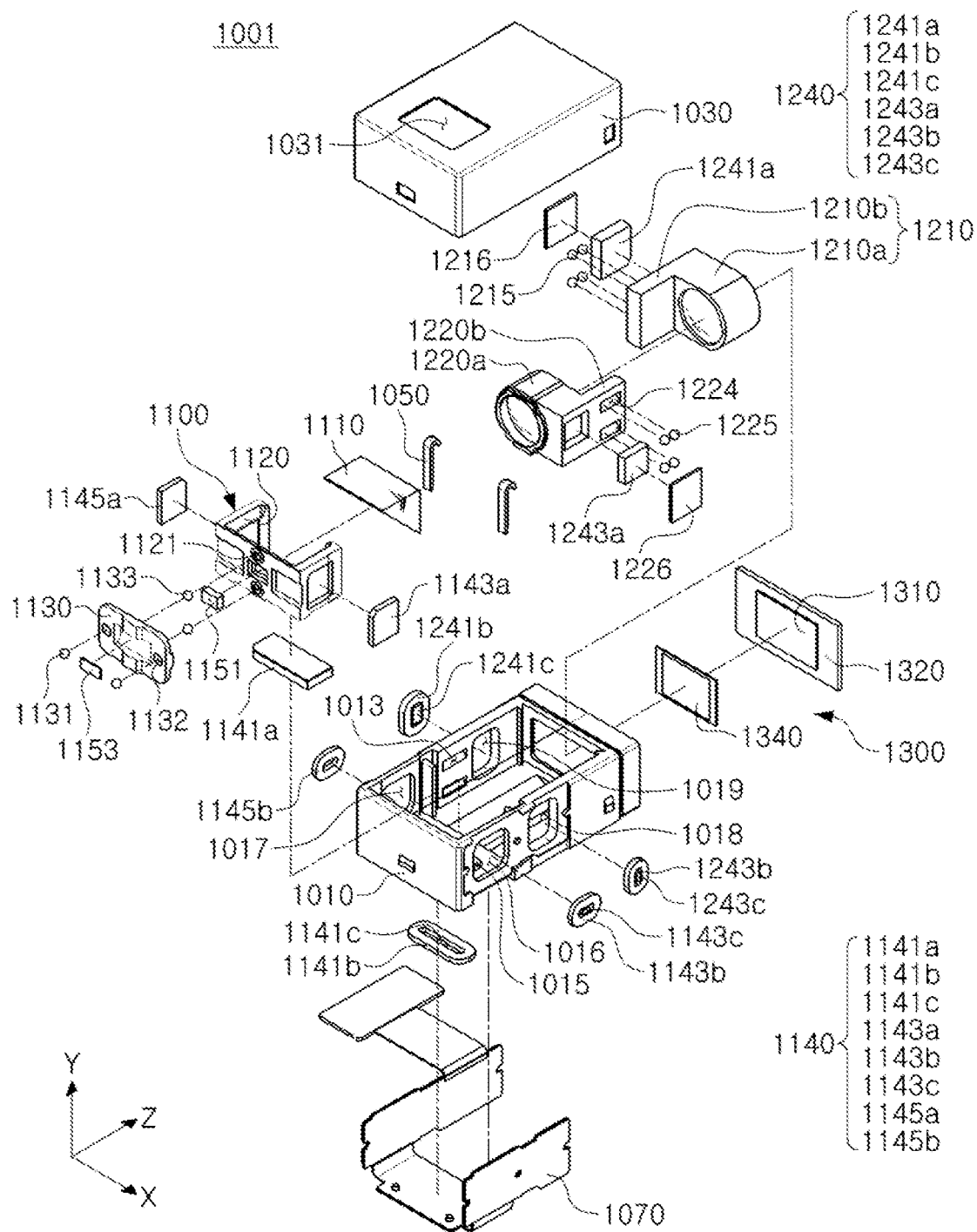
FIG. 4 is an exploded perspective view illustrating the first example of the camera module.
Figure 5:
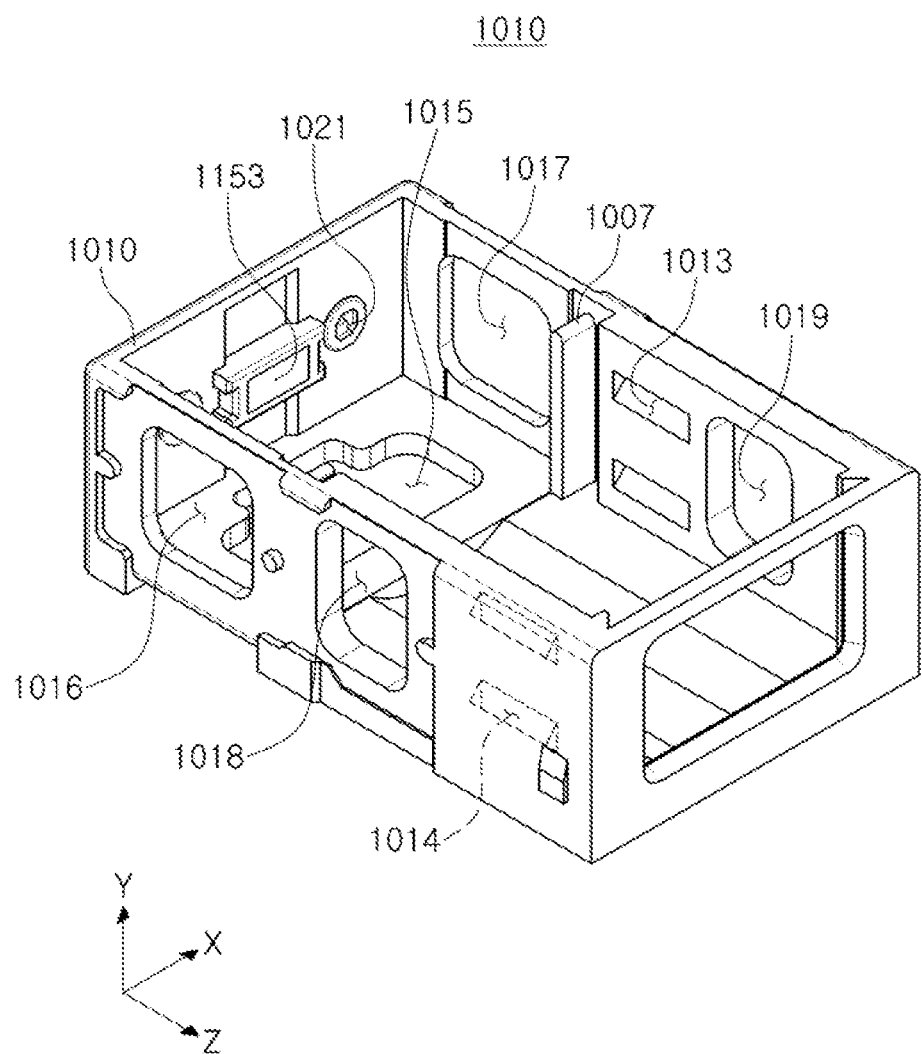
FIG. 5 is a perspective view illustrating a housing of the first example of the camera module.
Figure 6:
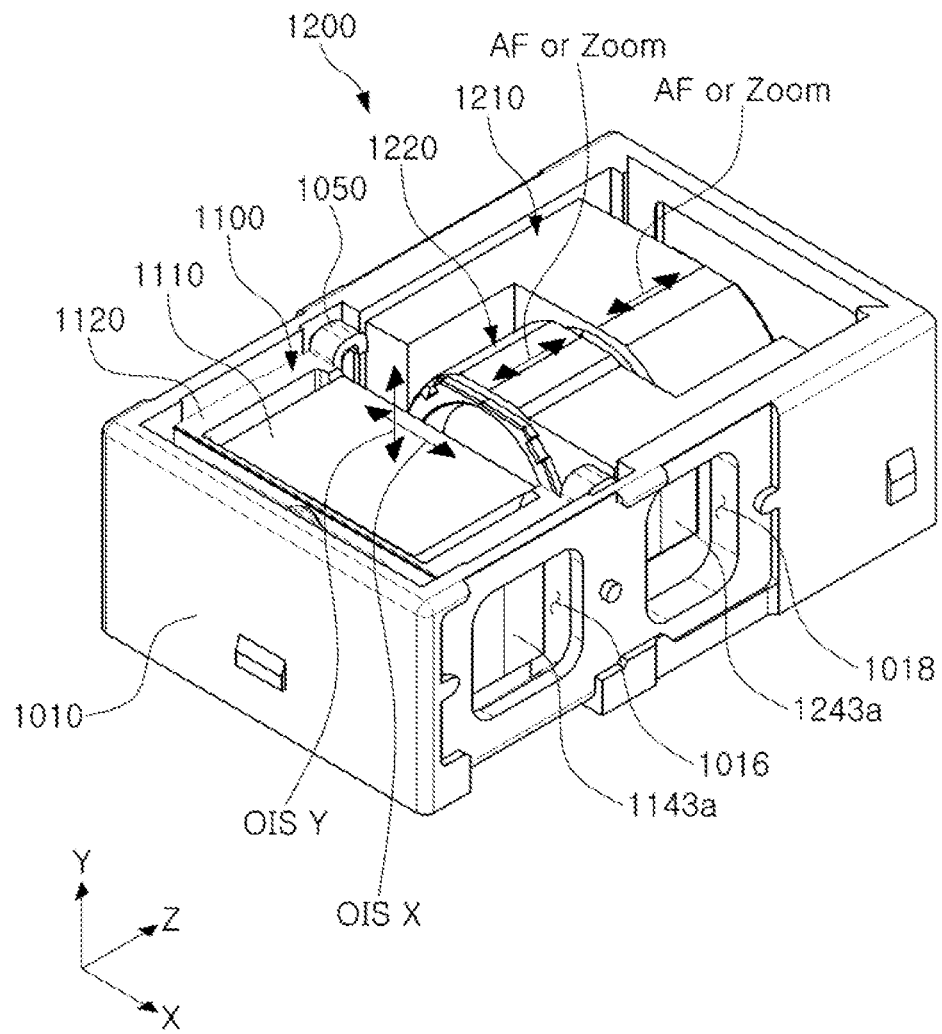
FIG. 6 is a perspective view illustrating that a reflecting module and a lens module are coupled to the housing of the first example of the camera module.
Figure 7:
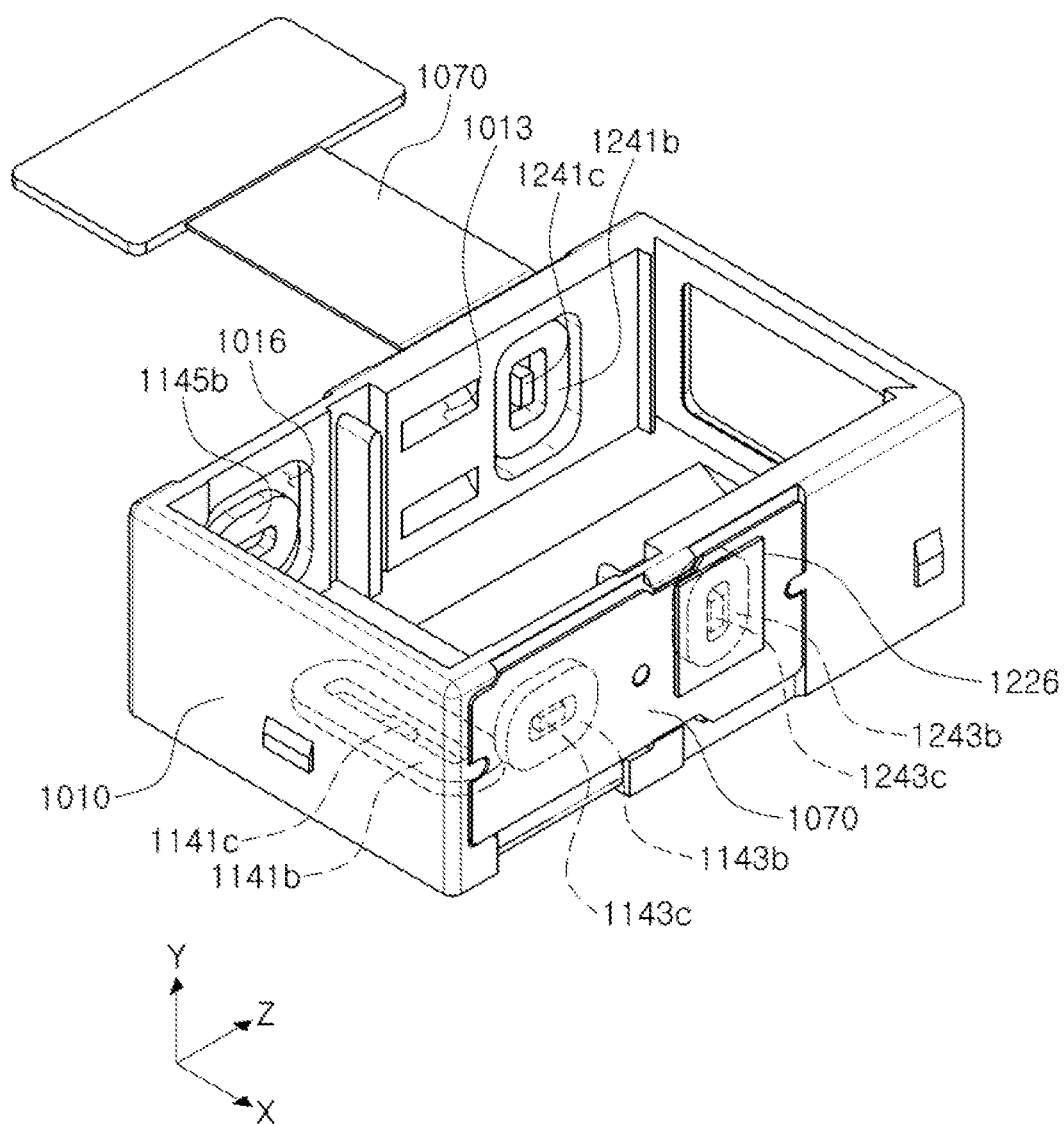
FIG. 7 is a perspective view illustrating that a board having driving coils and position sensors mounted thereon is coupled to the housing of the first example of the camera module.
Figure 8:
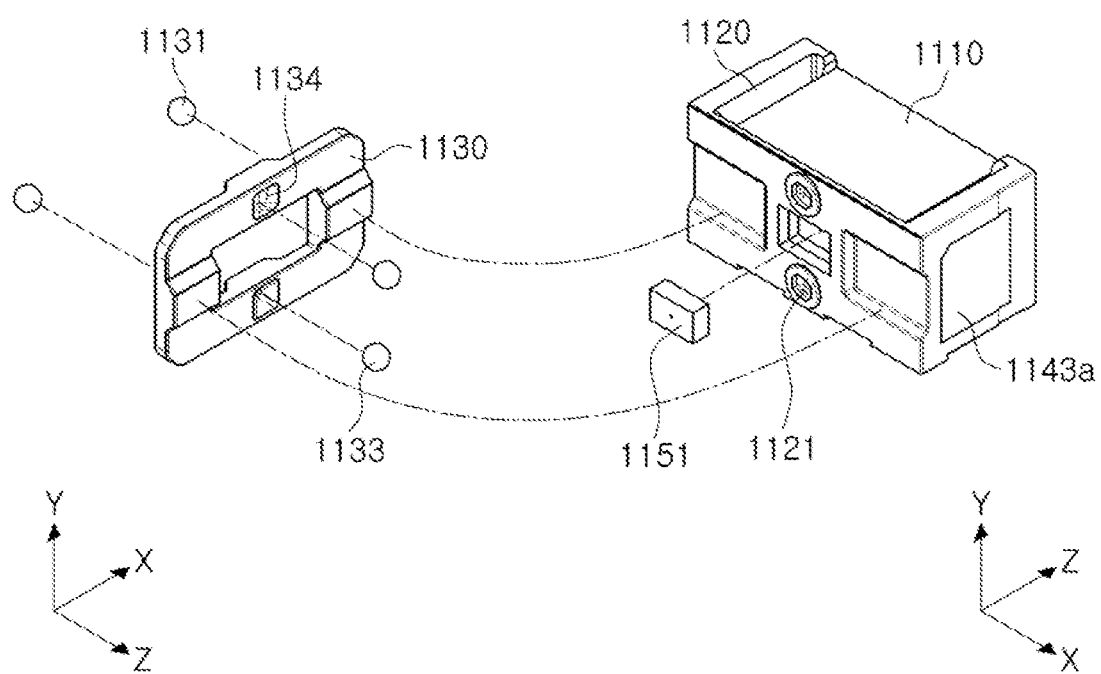
FIG. 8 is an exploded perspective view illustrating a rotating plate and a rotating holder in the first example of the camera module.
Figure 9:
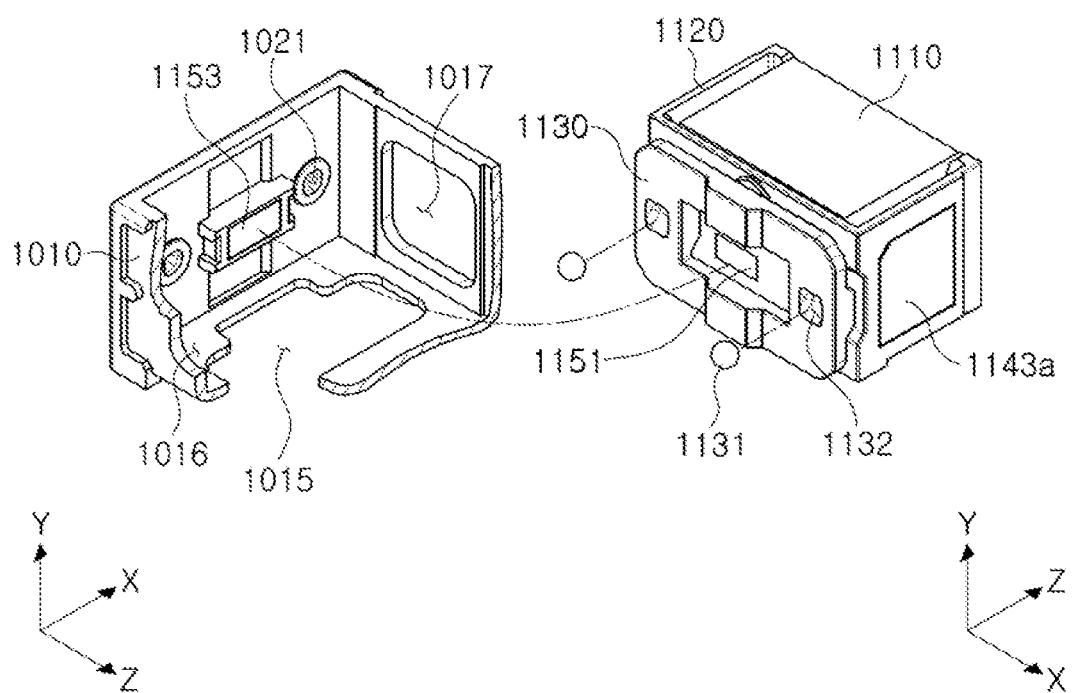
FIG. 9 is an exploded perspective view illustrating the housing and the rotating holder in the first example of the camera module.
Figure 10:
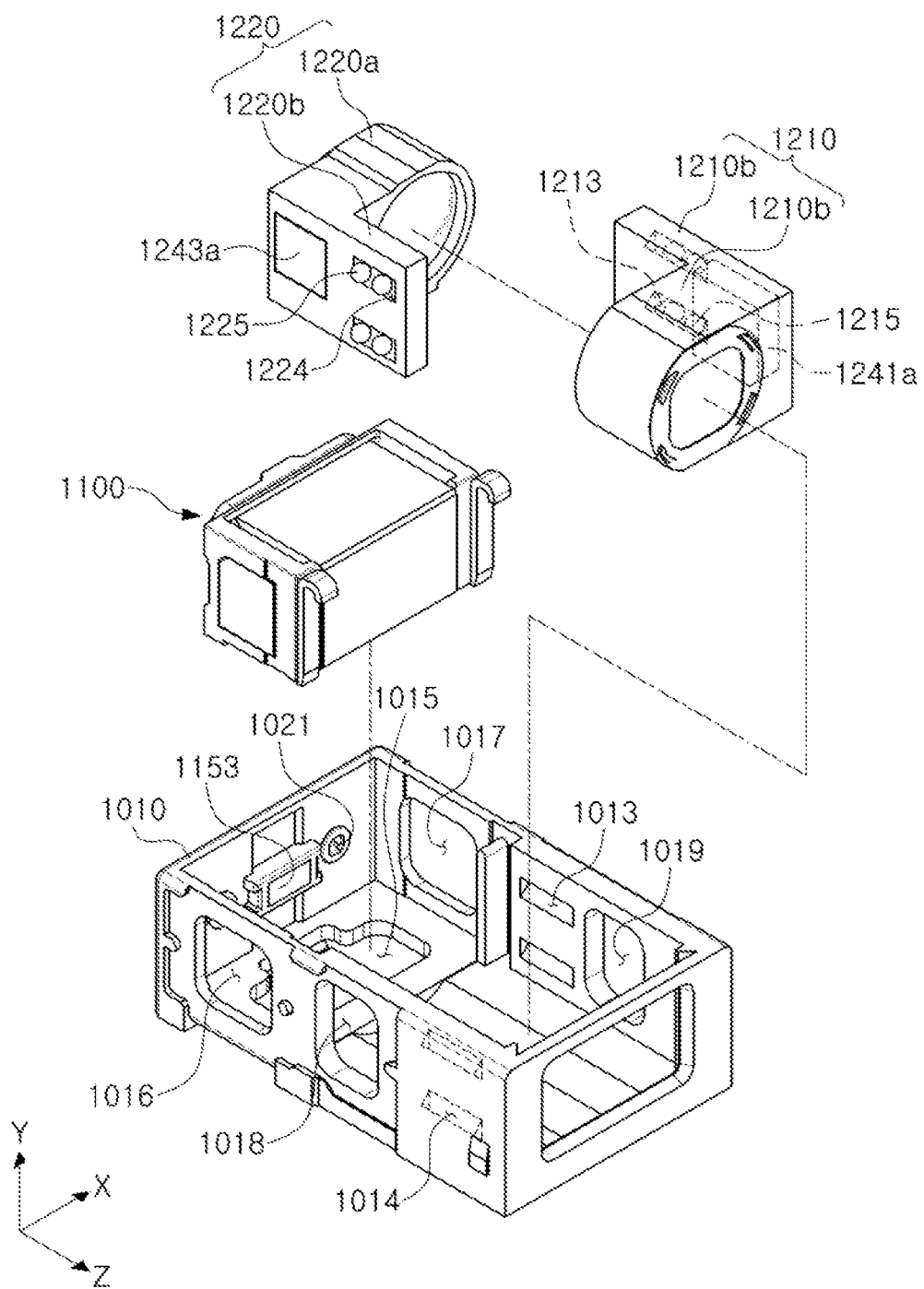
FIG. 10 is an exploded perspective view illustrating the housing and a lens barrel in the first example of the camera module.

Referring to FIGS. 2 through 4, the camera module 1001 according to the first example includes a reflecting module 1100, a lens module 1200, and an image sensor module 1300 disposed in a housing 1010.

The reflecting module 1100 changes a propagation direction of light. As an example, a propagation direction of light incident through an opening 1031 of a cover 1030 covering the camera module 1000 above the camera module 1000 is changed through the reflecting module 1100 so that the light is directed toward the lens module 1200. To this end, the reflecting module 1100 includes a reflecting member 1110 to reflect the light.

For example, a path of light incident to the camera module 1000 in the thickness direction (the Y-axis direction) of the camera module 1000 may be changed by the reflecting module 1100 to approximately coincide with the Z-axis direction and the optical axis direction.

The lens module 1200 includes lenses through which light passes of which the propagation direction was changed by the reflecting module 1100. The lens module 1200 includes at least two lens barrels 1210 and 1220. An AF function and a zoom function may be implemented by movement of the at least two lens barrels 1210 and 1220 in the optical axis direction (the Z-axis direction).

The image sensor module 1300 includes an image sensor 1310 to convert the light passing through the lenses into an electrical signal and a printed circuit board 1320 on which the image sensor 1310 is mounted. In addition, the image sensor module 1300 includes an optical filter 1340 to filter the light that passed through the lens module 1200 and is incident on the optical filter 1340. The optical filter 1340 may be an infrared cut-off filter.

In an internal space of the housing 1010, the reflecting module 1100 is disposed in front of the lens module 1200 and the image sensor module 1300 is disposed behind the lens module 1200.

Referring to FIGS. 2 through 10, the camera module 1001 according to a first example includes the reflecting module 1100, the lens module 1200, and the image sensor module 1300 disposed in the housing 1010.

The reflecting module 1100, the lens module 1200, and the image sensor module 1300 are sequentially disposed from one side of the housing 1010 to the other side thereof in the housing 1010. The housing 1010 includes the internal space into which the reflecting module 1100, the lens module 1200, and the image sensor module 1300 are inserted. The printed circuit board 1320 included in the image sensor module 1300 may be attached to an outer portion of the housing 1010.

For example, as illustrated in the drawings, the housing 1010 is integrally provided so that both of the reflecting module 1100 and the lens module 1200 are inserted into the internal space of the housing 1010. However, the housing 1010 is not limited thereto. For example, separate housings into which the reflecting module 1100 and the lens module 1200 are inserted, respectively, may also be connected to each other.

In addition, the housing 1010 is covered by the cover 1030 so that the internal space of the housing 1010 may not be visible.

The cover 1030 has the opening 1031 through which incident light passes, and a propagation direction of the incident light through the opening 1031 is changed by the reflecting module 1100, such that the light may be incident to the lens module 1200. The cover 1030 may be integrally provided to cover the entire housing 1010, or may be provided as separate members each covering the reflecting module 1100 and the lens module 1200.

To this end, the reflecting module 1100 includes the reflecting member 1110 to reflect the light. In addition, the light incident to the lens module 1200 passes through lens groups in at least two lens barrels 1210 and 1220 and is subsequently converted into and stored as the electrical signal by the image sensor 1310.

The housing 1010 includes the reflecting module 1100 and the lens module 1200 disposed in the internal space thereof. In the internal space of the housing 1010, a space in which the reflecting module 1100 is disposed and a space in which the lens module 1200 is disposed are distinguished from each other by a protruding wall 1007, for example, by more than one protruding wall. In addition, the reflecting module 1100 is disposed in front of the protruding walls 1007, and the lens module 1200 is disposed behind the protruding walls 1007. The protruding walls 1007 may protrude from opposite sidewalls of the housing 1010 into the internal space.

In the reflecting module 1100 disposed in front of the protruding walls 1007, a rotating holder 1120 is closely adhered to and supported by an inner wall surface of the housing 1010 by attractive force between a pulling yoke 1153 disposed on the inner wall surface of the housing 1010 and a pulling magnet 1151 disposed on the rotating holder 1120. Here, although not illustrated in the drawings, the housing 1010 may also be provided with a pulling magnet, and the rotating holder 1120 may also be provided with a pulling yoke. However, a structure illustrated in the drawings will hereinafter be described for convenience of explanation.

First ball bearings 1131, a rotating plate 1130, and second ball bearings 1133 are disposed between the inner wall surface of the housing 1010 and the rotating holder 1120.

In addition, since the first ball bearings 1131 and the second ball bearings 1133 are closely adhered to guide grooves 1132, 1134, 1021, and 1121 while being partially inserted into the guide grooves 1132, 1134, 1021, and 1121 as described below, when the rotating holder 1120 and the rotating plate 1130 are inserted into the internal space of the housing 1010, a slight space may exist between the rotating holder 1120 and the protruding walls 1007, and after the rotating holder 1120 is mounted in the housing 1010, the rotating holder 1120 may be closely adhered to the inner wall surface of the housing 1010 by the attractive force between the pulling yoke and the pulling magnet, and a small space thus remains between the rotating holder 1120 and the protruding walls 1007.

Therefore, the housing 1010 includes stoppers 1050 fitted onto the protruding walls 1007 while supporting the rotating holder 1120 and having a hook shape. Alternatively, when the stoppers 1050 are not provided, the rotating holder may be fixed to the housing by the attractive force between the pulling magnet 1151 and the pulling yoke 1153. The stoppers 1050 have a hook shape, and support the rotating holder 1120 in a state in which hook portions thereof are hooked onto the protruding walls 1007.

The stoppers 1050 serve as brackets supporting the rotating holder 1120 when the reflecting module 1100 is not driven, and additionally serve as the stoppers 1050 to adjust movement of the rotating holder 1120 when the reflecting module 1100 is driven. The stoppers 1050 are disposed, respectively, on the protruding walls 1007 protruding from opposite sidewalls of the housing. A space between the stoppers 1050 and the rotating holder 1120 allows the rotating holder 1120 to smoothly rotate. Alternatively, the stoppers 1050 may be formed of an elastic material to allow the rotating holder 1120 to be smoothly moved in a state in which the rotating holder 1120 is supported by the stoppers 1050.

In addition, the housing 1010 includes a first driving portion 1140 and a second driving portion 1240 for driving the reflecting module 1100 and the lens module 1200, respectively. The first driving portion 1140 includes coils 1141*b*, 1143*b*, and 1145*b* for driving the reflecting module 1100, and the second driving portion 1240 includes coils 1241*b* and 1243*b* for driving the lens modules 1200 (provided in the plural and including the first lens barrel 1210 and the second lens barrel 1220).

In addition, since the coils 1141*b*, 1143*b*, 1145*b*, 1241*b*, and 1243*b* are disposed on the housing 1010 in a state in which they are mounted on a main board 1070, the housing 1010 is provided with through-holes 1015, 1016, 1017, 1018, and 1019 so that the coils 1141*b*, 1143*b*, 1145*b*, 1243*b*, and 1241*b*, respectively, are exposed to the internal space of the housing 1010.

Here, the main board 1070 on which the coils 1141*b*, 1143*b*, 1145*b*, 1241*b*, and 1243*b* are mounted is entirely connected and integrally provided as illustrated in the drawings. In this case, a terminal is provided as a single terminal, and connection of an external power supply and signals may thus be easy. However, the main board 1070 is not limited thereto, but may also be provided as boards by separating a board on which coils for the reflecting module 1100 are mounted and a board on which coils for the lens module 1200 are mounted from each other.

The reflecting module 1100 may change the path of the light incident thereto through the opening 1031. When an image or a moving picture is captured, the image may be blurred or the moving picture may be shaken due to hand-shake, or the like, of a user. In this case, the reflecting module 1100 may correct the hand-shake, or the like, of the user by moving the rotating holder 1120 on which the reflecting member 1110 is mounted. For example, when hand-shake is generated at the time of capturing the image or the moving picture due to the hand-shake, or the like, of the user, a relative displacement corresponding to the hand-shake is provided to the rotating holder 1120 to compensate for the hand-shake.

In addition, the OIS function is implemented by the movement of the rotating holder 1120 having a relatively low weight since it does not include lenses, and the like, and power consumption may thus be significantly reduced.

That is, in the present exemplary embodiment, the light in which the OIS is performed is incident to the lens module 1200 by changing the propagation direction of the light by the movement of the rotating holder 1120 on which the reflecting member 1110 is provided without moving the lens barrel including the lenses or the image sensor in order to implement the OIS function.

The reflecting module 1100 includes the rotating holder 1120 disposed in the housing 1010 to be supported by the housing 1010, the reflecting member 1110 mounted on the rotating holder 1120, and the first driving portion 1140 moving the rotating holder 1120.

The reflecting member 1110 may change the propagation direction of the light. For example, the reflecting member 1110 is a mirror or a prism reflecting the light. An example, in which the reflecting member 1110 is a prism is illustrated in the drawings for convenience of explanation, but the reflecting member 1110 is not intended to be limited thereto.

The reflecting member 1110 is fixed to the rotating holder 1120. The rotating holder 1120 has a mounting surface 1123 on which the reflecting member 1110 is mounted.

The mounting surface 1123 of the rotating holder 1120 may be an inclined surface so that the path of the light is changed. For example, the mounting surface 1123 is an inclined surface inclined with respect to the optical axis (the Z axis) of each of the lenses by an angle in a range of 30° to 60°. In addition, the inclined surface of the rotating holder 1120 is directed toward the opening 1031 of the cover 1030 through which the light is incident.

The rotating holder 1120 on which the reflecting member 1110 is mounted is movably accommodated in the internal space of the housing 1010. For example, the rotating holder 1120 is accommodated in the housing 1010 to be rotatable around a first axis (an X axis) and a second axis (a Y axis). Here, the first axis (the X axis) and the second axis (the Y axis) refer to axes perpendicular to the optical axis (the Z axis), and are perpendicular to each other, although they need not be.

The rotating holder 1120 is supported by the housing 1010 by the first ball bearings 1131 aligned along the first axis (the X axis) and the second ball bearings 1133 aligned along the second axis (the Y axis) so that the rotating holder 1120 smoothly rotates around the first axis (the X axis) and the second axis (the Y axis). In the drawings, two first ball bearings 1131 aligned along the first axis (the X axis) and two second ball bearings 1133 aligned along the second axis (the Y axis) are illustrated by way of example. In addition, the rotating holder 1120 rotates around the first axis (the X axis) and the second axis (the Y axis) by a first driving portion 1140 to be described below.

Since the ball bearings respectively in charge of the first axis (the X axis) and the second axis (the Y axis) are provided, the two first ball bearings 1131 aligned along the first axis (the X axis) may be provided in a cylindrical shape extended in the first axis (the X axis), and the two second ball bearings 1133 aligned along the second axis (the Y axis) may be provided in a cylindrical shape extended on the second axis (the Y axis). In this case, the guide grooves 1021, 1121, 1132, and 1134 may also be provided in a semi-cylindrical shape corresponding to shapes of the first and second ball bearings.

In addition, the first ball bearings 1131 and the second ball bearings 1133 are disposed on a front surface and a rear surface of the rotating plate 1130, respectively. Alternatively, the first ball bearings 1131 and the second ball bearings 1133 may be disposed on the rear surface and the front surface of the rotating plate 1130, respectively. That is, the first ball bearings 1131 may be aligned along the second axis (the Y axis) and the second ball bearings 1133 may be aligned along the first axis (the X axis). The structure illustrated in the drawings will hereinafter be described for convenience of explanation. The rotating plate 1130 is disposed between the rotating holder 1120 and an inner surface of the housing 1010.

In addition, the rotating holder 1120 is supported by the housing 1010 through the rotating plate 1130 (the first ball bearings 1131 and the second ball bearings 1133 may also be disposed between the rotating holder 1120 and the housing 1010) by the attractive force between the pulling magnet 1151 or the pulling yoke disposed on the rotating holder 1120 and the pulling yoke 1153 or the pulling magnet disposed on the housing 1010.

The guide grooves 1132 and 1134 into which the first ball bearings 1131 and the second ball bearings 1133 are inserted, respectively, are disposed in the front surface and the rear surface of the rotating plate 1130, respectively, and include first guide grooves 1132 into which the first ball bearings 1131 are partially inserted and second guide grooves 1134 into which the second ball bearings 1133 are partially inserted.

In addition, the housing 1010 includes third guide grooves 1021 into which the first ball bearings 1131 are partially inserted, and the rotating holder 1120 includes fourth guide grooves 1121 into which the second ball bearings 1133 are partially inserted.

The first guide grooves 1132, the second guide grooves 1134, the third guide grooves 1021, and the fourth guide grooves 1121 described above may be provided in a hemispherical or polygonal (poly-prismatic or poly-pyramidal) groove shape so that the first ball bearings 1131 and the second ball bearings 1133 easily rotate.

The first ball bearings 1131 and the second ball bearings 1133 may serve as bearings while being rolled or slid in the first guide grooves 1132, the second guide grooves 1134, the third guide grooves 1021, and the fourth guide grooves 1121.

The first ball bearings 1131 and the second ball bearings 1133 may have a structure in which they are fixedly disposed in at least one of the housing 1010, the rotating plate 1130, and the rotating holder 1120. For example, the first ball bearings 1131 may be fixedly disposed in the housing 1010 or the rotating plate 1130, and the second ball bearings 1133 may be fixedly disposed in the rotating plate 1130 or the rotating holder 1120.

In this case, only a member facing a member in which the first ball bearings 1131 or the second ball bearings 1133 are fixedly disposed may be provided with the guide grooves. In this case, the ball bearings may serve as friction bearings by sliding thereof rather than rotation thereof.

Here, when the first ball bearings 1131 and the second ball bearings 1133 are fixedly disposed in any one of the housing 1010, the rotating plate 1130, and the rotating holder 1120, the first ball bearings 1131 and the second ball bearings 1133 may be provided in a spherical shape, a hemispherical shape, a round protrusion shape, or the like.

In addition, the first ball bearings 1131 and the second ball bearings 1133 may be separately manufactured and may then be attached to any one of the housing 1010, the rotating plate 1130, and the rotating holder 1120. Alternatively, the first ball bearings 1131 and the second ball bearings 1133 may be provided integrally with the housing 1010, the rotating plate 1130, or the rotating holder 1120 at the time of manufacturing the housing 1010, the rotating plate 1130, or the rotating holder 1120.

The first driving portion 1140 generates driving force so that the rotating holder 1120 is rotatable around the two axes.

As an example, the first driving portion 1140 includes magnets 1141a, 1143a, and 1145a and the coils 1141b, 1143b, and 1145b disposed to face the magnets 1141a, 1143a, and 1145a.

When power is applied to the coils 1141b, 1143b, and 1145b, the rotating holder 1120 on which the magnets 1141a, 1143a, and 1145a are mounted rotates around the first axis (the X axis) and the second axis (the Y axis) through electromagnetic interaction between the magnets 1141a, 1143a, and 1145a and the coils 1141b, 1143b, and 1145b.

The magnets 1141a, 1143a, and 1145a may be mounted on the rotating holder 1120. As an example, some 1141a of the magnets 1141a, 1143a, and 1145a are mounted on a lower surface of the rotating holder 1120, and the others 1143a and 1145a of the magnets 1141a, 1143a, and 1145a are mounted on side surfaces of the rotating holder 1120.

The coils 1141b, 1143b, and 1145b may be mounted on the housing 1010. As an example, the coils 1141b, 1143b, and 1145b are mounted on the housing 1010 through the main board 1070. That is, the coils 1141b, 1143b, and 1145b are disposed on the main board 1070, and the main board 1070 is mounted on the housing 1010.

Here, an example in which the main board 1070 is entirely integrally provided so that both of the coils for the reflecting module 1100 and the coils for the lens module 1200 are mounted thereon is illustrated in the drawings, but the main board 1070 may be provided as two or more separate boards on which the coils for the reflecting module 1100 and the coils for the lens module 1200 are mounted, respectively.

When the rotating holder 1120 rotates, a closed loop control manner of sensing and feeding back a position of the rotating holder 1120 is used.

Therefore, position sensors 1141c and 1143c are included in order to perform a closed loop control. The position sensors 1141c and 1143c may be hall sensors.

The position sensors 1141c and 1143c may be disposed inside or outside the coils 1141b and 1143b, respectively, and may be mounted on the main board 1070 on which the coils 1141b and 1143b are mounted.

The main board 1070 may be provided with a gyro sensor 1079 (FIG. 14) to sense a shake factor such as the handshake, or the like, of the user, and may be provided with a driver integrated circuit (IC) (not illustrated) providing driving signals to the coils 1141b, 1143b, and 1145b.

When the rotating holder 1120 rotates around the first axis (the X axis), the rotating holder 1120 rotates depending on rotation of the rotating plate 1130 around the first ball bearings 1131 arranged along the first axis (the X axis) (in this case, the rotating holder 1120 is not relatively moved with respect to the rotating plate 1130).

In addition, when the rotating holder 1120 rotates around the second axis (the Y axis), the rotating holder 1120 rotates around the second ball bearings 1133 arranged along the second axis (the Y axis) (in this case, the rotating plate 1130 does not rotate, and the rotating holder 1120 is thus relatively moved with respect to the rotating plate 1130).

That is, when the rotating holder 1120 rotates around the first axis (the X axis), the first ball bearings 1131 act as a pivot, and when the rotating holder 1120 rotates around the second axis (the Y axis), the second ball bearings 1133 act as a pivot. The reason is that the second ball bearings 1133 aligned along the second axis (the Y axis) are not moved in a state in which they are fitted into the guide grooves when the rotating holder 1120 rotates around the first axis (the X axis) and the first ball bearings 1131 aligned along the first axis (the X axis) are not moved in a state in which they are fitted into the guide grooves when the rotating holder 1120 rotates around the second axis (the Y axis), as illustrated in the drawings.

The light reflected from the reflecting module 1100 is incident to the lens module 1200. In addition, the AF function or the zoom function for the incident light is implemented by movement, in the optical axis direction (the Z-axis direction), of at least two lens barrels 1210 and 1220 provided in the lens module 1200.

Stacked lens groups provided in the lens module 1200 are divided and disposed in at least two lens barrels 1210 and 1220. In addition, even though the stacked lens groups are divided and disposed in at least two lens barrels 1210 and 1220, optical axes of the lens groups may be aligned in the Z-axis direction, a direction in which the light is emitted from the reflecting module 1100.

The lens module 1200 includes the second driving portion 1240 in order to implement the AF function and the zoom function.

The lens module 1200 includes at least two lens barrels, that is, the first lens barrel 1210 and the second lens barrel 1220, disposed in the internal space of the housing 1010 to be movable in the optical axis direction (the Z-axis direction). In addition, the lens module 1200 includes the second driving portion 1240 to move the first lens barrel 1210 and the second lens barrel 1220 in the optical axis direction (Z-axis direction) with respect to the housing 1010.

The first and second lens barrels 1210 and 1220 are configured to be moved in the approximately optical axis direction (the Z-axis direction) in order to implement the AF function or the zoom function.

Therefore, the second driving portion 1240 generates driving force so that the first and second lens barrels 1210 and 1220 are movable in the optical axis direction (the Z-axis direction). That is, the second driving portion 1240 individually moves the first and second lens barrels 1210 and 1220 in the optical axis direction (that Z-axis direction) to allow the AF function and the zoom function to be implemented.

The first and second lens barrels 1210 and 1220 are provided to be supported by sidewalls or a bottom surface of the housing 1010. For example, both of the first and second lens barrels 1210 and 1220 may be supported by the bottom surface of the housing 1010 through ball bearings, or the first and second lens barrels 1210 and 1220 may be individually supported by opposite sidewalls of the housing 1010, respectively, through ball bearings. Hereinafter, an example in which the first and second lens barrels 1210 and 1220 are supported by the opposite sidewalls of the housing 1010, respectively, through the ball bearings will be mainly described.

As an example, the second driving portion 1240 includes magnets 1241a and 1243a and the coils 1241b and 1243b disposed to face the magnets 1241a and 1243a.

When power is applied to the coils 1241b and 1243b, the first and second lens barrels 1210 and 1220 on which the magnets 1241a and 1243a are mounted, respectively, may be moved in the optical axis direction (the Z-axis direction) by electromagnetic interaction between the magnets 1241a and 1243a and the respective coils 1241b and 1243b.

Some 1241a of the magnets 1241a and 1243a may be mounted on the first lens barrel 1210. As an example, magnets 1241a are mounted on side surfaces of the first lens barrel 1210. In addition, the other magnets 1243a may be mounted on the second lens barrel 1220. As an example, the other magnets 1243a are mounted on side surfaces of the second lens barrel 1220.

Some 1241b of the coils 1241b and 1243b may be mounted on the housing 1010 to face some 1241a of the magnets. In addition, the other coils 1243b may be mounted on the housing 1010 to face the other magnets 1243a. Here, since the first and second lens barrels 1210 and 1220 are supported by the opposite sidewalls of the housing 1010, respectively, some coils 1241b are disposed on one sidewall of the housing 1010, and the other coils 1243b are disposed on the other sidewall of the housing 1010.

As an example, the main board 1070 is mounted on the housing 1010 in a state in which the coils 1241b and 1243b are mounted on the main board 1070.

When the first and second lens barrels 1210 and 1220 are moved, a closed loop control manner of sensing and feeding back positions of the first and second lens barrels 1210 and 1220 is used. Therefore, position sensors 1241c and 1243c are included in order to perform a closed loop control. The position sensors 1241c and 1243c may be hall sensors.

The position sensors 1241c and 1243c may be disposed inside or outside the coils 1241b and 1243b, respectively, and are mounted on the main board 1070 on which the coils 1241b and 1243b are mounted.

The first lens barrel 1210 is disposed in the housing 1010 to be movable in the optical axis direction (the Z-axis direction). As an example, third ball bearings 1215 are disposed between the lens barrel 1210 and one sidewall of the housing 1010.

The third ball bearings 1215 serve as bearings guiding movement of the first lens barrel 1210 in a process of implementing the AF function and the zoom function. In addition, the third ball bearings 1215 serve to maintain an interval between the first lens barrel 1210 and the housing 1010.

The third ball bearings 1215 are configured to be rolled in the optical axis direction (the Z-axis direction) when the driving force moving the first lens barrel 1210 in the optical axis direction (the Z-axis direction) is generated. Therefore, the third ball bearings 1215 guide the movement of the first lens barrel 1210 in the optical axis direction (the Z-axis direction).

Guide grooves 1213 and 1013 accommodating the third ball bearings 1215 therein are formed in facing surfaces of the first lens barrel 1210 and the housing 1010, respectively, and some of the guide grooves 1213 and 1013 may be elongated in the optical axis direction (the Z-axis direction).

The third ball bearings 1215 are accommodated in the guide grooves 1213 and 1013 and are fitted between the first lens barrel 1210 and the housing 1010.

Some or all of the guide grooves 1213 and 1013 may be elongated in the optical axis direction (the Z-axis direction). In addition, cross sections of the guide grooves 1213 and 1013 may have various shapes such as a round shape, a polygonal shape, and the like.

The first lens barrel 1210 is pressed toward one sidewall of the housing 1010 so that the third ball bearings 1215 are maintained in a state in which they are in contact with the first lens barrel 1210 and the housing 1010.

To this end, the housing 1010 is mounted with a pulling yoke 1216 facing the magnet 1241*a* mounted on the first lens barrel 1210. The pulling yoke 1216 is formed of a magnetic material.

Attractive force acts between the pulling yoke 1216 and the magnet 1241*a*. Therefore, the first lens barrel 1210 is moved in the optical axis direction (the Z-axis direction) by the driving force of the second driving portion 1240 in a state in which it is in contact with the third ball bearings 1215.

The second lens barrel 1220 is disposed in the housing 1010 to be movable in the optical axis direction (the Z-axis direction). As an example, the second lens barrel 1220 is disposed in parallel with the first lens barrel 1210 in the optical axis direction in front of the first lens barrel 1210.

Fourth ball bearings 1225 are disposed between the second lens barrel 1220 and a sidewall of the housing 1010, that is, the other sidewall of the housing 1010 opposing one sidewall of the housing 1010 to which the first lens barrel 1210 is supported, and the second lens barrel 1220 may be slid or rolled with respect to the housing 1010 by the fourth ball bearings 1225.

The fourth ball bearings 1225 are configured to assist in a rolling motion or a sliding motion of the second lens barrel 1220 in the optical axis direction (the Z-axis direction) when the driving force is generated so that the second lens barrel 1220 is moved in the optical axis direction (the Z-axis direction).

Guide grooves 1224 and 1014 accommodating the fourth ball bearings 1225 therein are formed in facing side surfaces of the second lens barrel 1220 and the housing 1010 respectively, and some of the guide grooves may be elongated in the optical axis direction (the Z-axis direction).

The fourth ball bearings 1225 are accommodated in the guide grooves 1224 and 1014 and are fitted between the second lens barrel 1220 and the housing 1010.

Each of the guide grooves 1224 and 1014 may be elongated in the optical axis direction (the Z-axis direction). In addition, cross sections of the guide grooves 1224 and 1014 may have various shapes such as a round shape, a polygonal shape, and the like.

The second lens barrel 1220 is pressed toward the housing 1010 so that the fourth ball bearings 1225 are maintained in a state in which they are in contact with the second lens barrel 1220 and the housing 1010. That is, the second lens barrel 1220 is pressed toward the housing 1010 in a sidewall direction in which the fourth ball bearings 1225 are disposed.

To this end, the housing 1010 is mounted with a pulling yoke 1226 facing the magnet 1243*a* mounted on the second lens barrel 1220. The pulling yoke 1226 is formed of a magnetic material.

Attractive force acts between the pulling yoke 1226 and the magnet 1243*a*. Therefore, the second lens barrel 1220 is moved in the optical axis direction (the Z-axis direction) by the driving force of the second driving portion 1240 in a state in which the second lens barrel 1220 is in contact with the fourth ball bearings 1225.

Figure 11:
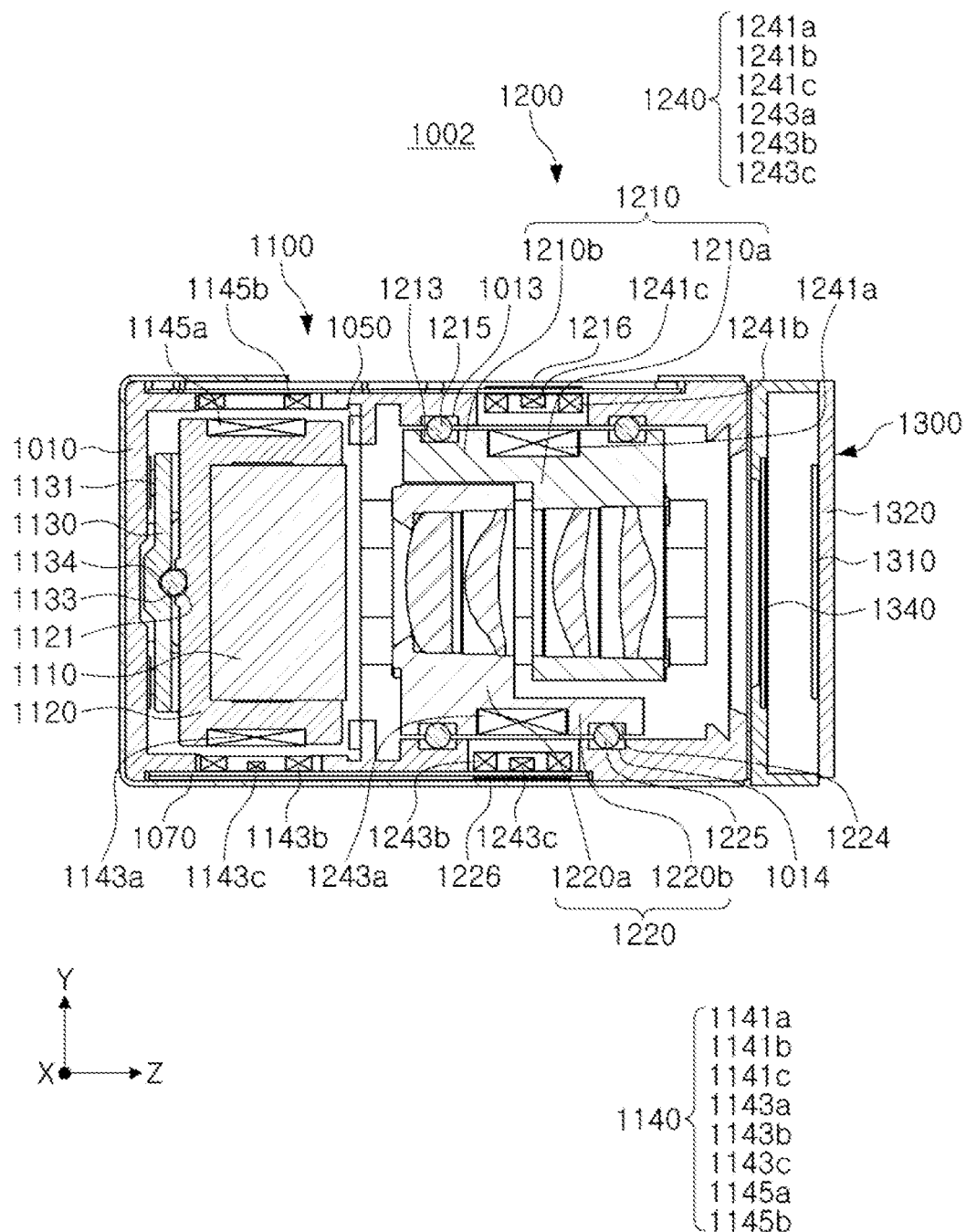
FIG. 11 is a cross-sectional view illustrating a second example of the camera module of FIG. 2.

FIG. 11 is a cross-sectional view illustrating a second example of a camera module.

Referring to FIG. 11, the second example of the camera module 1002 is different from the first example of the camera module 1001, in that magnets 1241*a* and 1243*a* are disposed between ball bearings 1215 and 1225, respectively, in the optical axis direction. Hereinafter, the components will be denoted by the same reference numerals, and a further detailed description therefor will be omitted. In addition, only components different from those described above will be described in further detail.

First and second lens barrels 1210 and 1220 have lengths approximately the same as each other in the optical axis direction. In addition, the first and second lens barrels 1210 and 1220 include first and second lens seating portions 1210*a* and 1220*a* provided with lens arrays, and first and second extending portions 1210*b* and 1220*b* each extending from the first and second lens seating portions 1210*a* and 1220*a* in the optical axis direction, respectively.

The first and second lens barrels 1210 and 1220 include third and fourth ball bearings 1215 and 1225 divided and disposed in the first and second lens seating portions 1210*a* and 1220*a* and the first and second extending portions 1210*b* and 1220*b*, respectively.

The first and second lens barrels 1210 and 1220 include, respective magnets 1241*a* and 1243*a* of a second driving portion 1240 disposed in approximately central portions thereof in the optical axis direction. In addition, the magnet 1241*a* disposed on the first lens barrel 1210 is disposed between third ball bearings 1215 spaced apart from each other in the optical axis direction. Likewise, the magnet 1243*a* disposed on the second lens barrel 1220 is disposed between fourth ball bearings 1225 spaced apart from each other in the optical axis direction.

Figure 12:
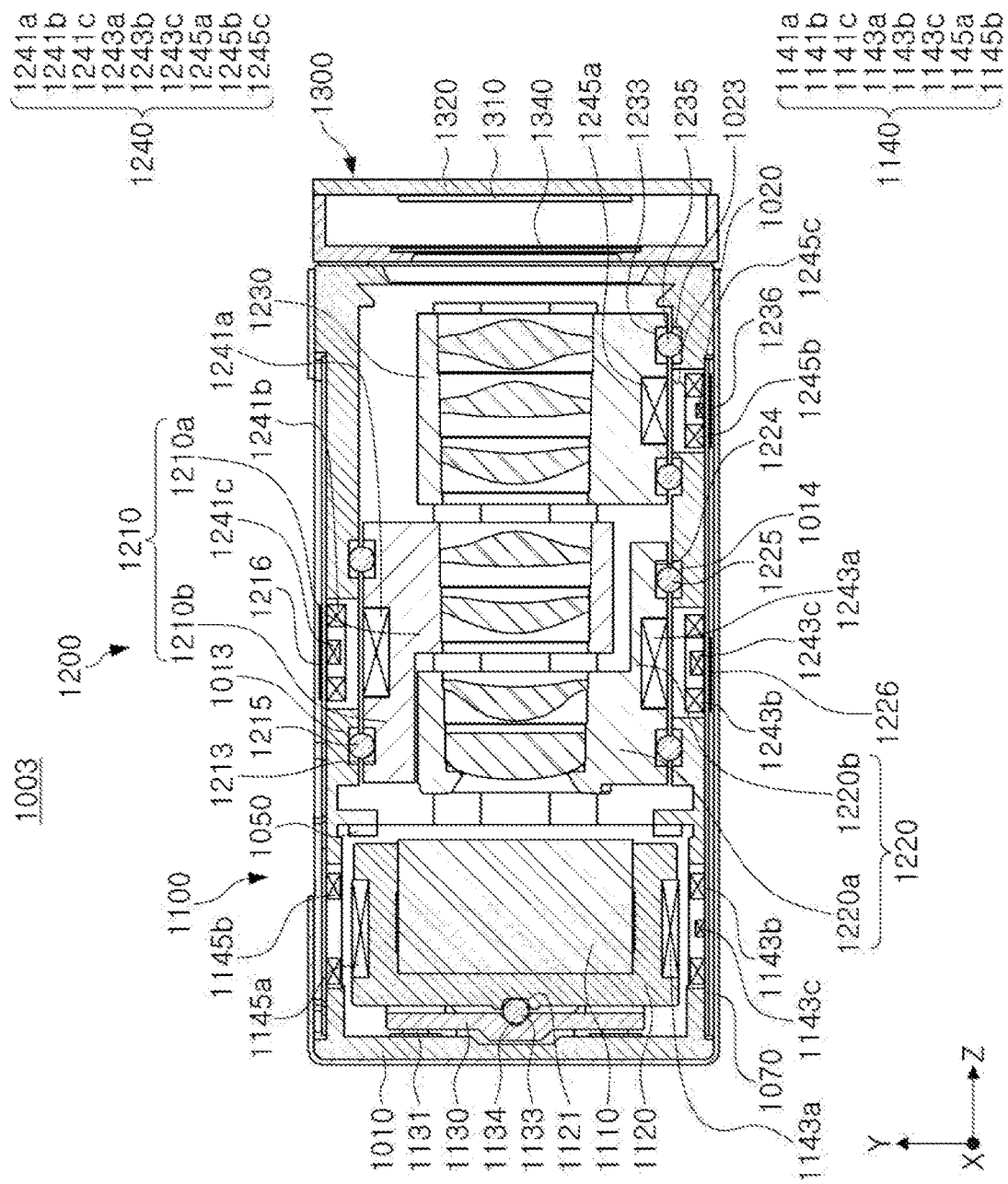
FIG. 12 is a cross-sectional view illustrating a third example of the camera module of FIG. 2.
Figure 13:
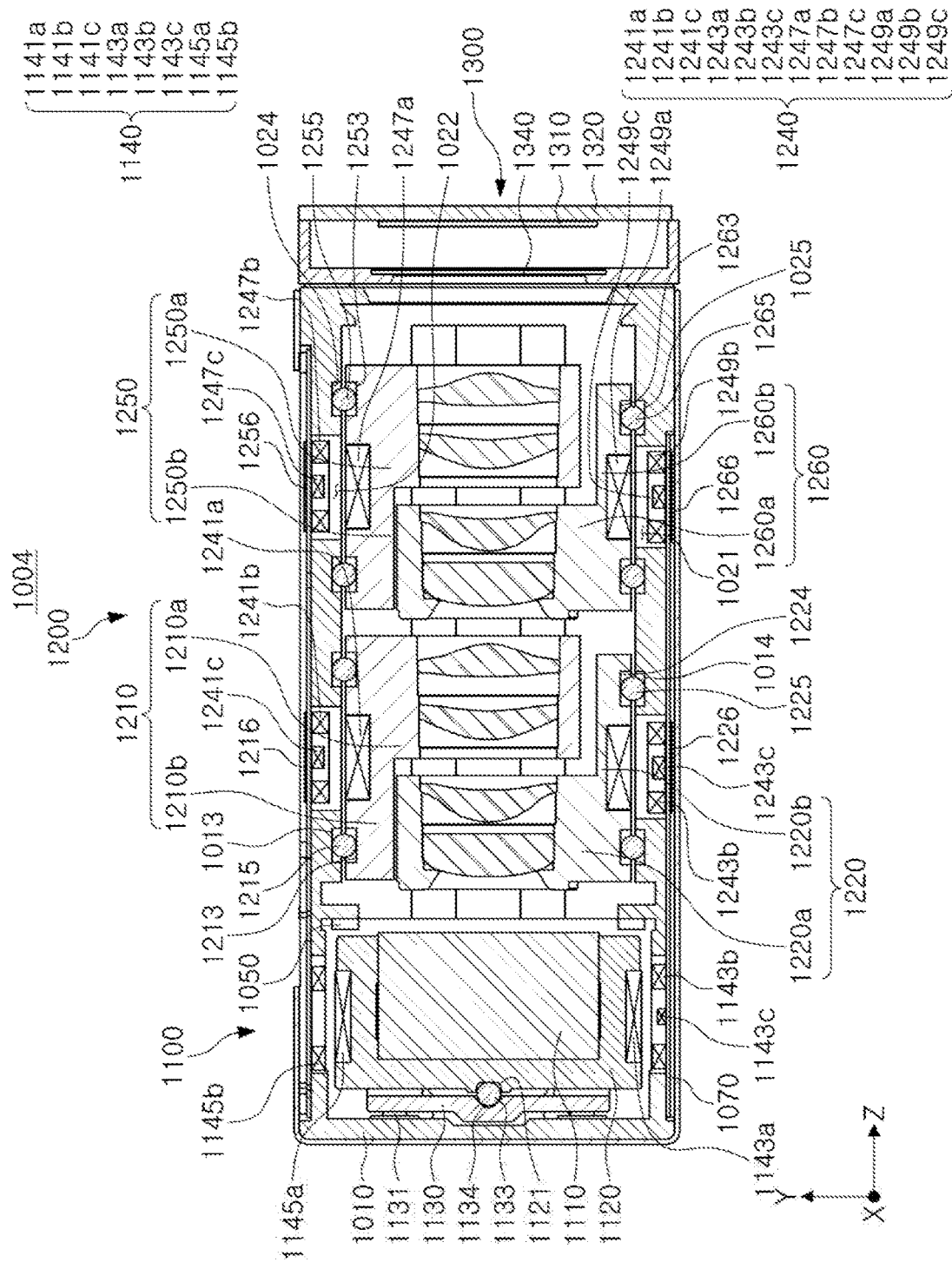
FIG. 13 is a cross-sectional view illustrating a fourth example of the camera module of FIG. 2.

FIG. 12 is a cross-sectional view illustrating a third example of a camera module, and FIG. 13 is a cross-sectional view illustrating a fourth example of a camera module.

The third example of a camera module 1003 or the fourth example of a camera module 1004 includes three or more lens barrels. The third example of the camera module 1003 and the fourth example of the camera module 1004 have the same structure as that of the first and second examples of the camera modules illustrated in FIGS. 2 through 11 in which the two lens barrels are provided, except that additional lens barrels are provided. Hereinafter, the components will be denoted by the same reference numerals, and a further detailed description thereof will be omitted.

As illustrated in FIG. 12, the third example of the camera module 1003 includes an odd number of lens barrels 1210, 1220, and 1230.

A pair of lens barrels 1210 and 1220 of the lens barrels 1210, 1220, and 1230 are continuously provided in the optical axis direction (the Z-axis direction) as in the first example of the camera module 1001 and the second example of the camera module 1002, and a third lens barrel 1230 is additionally provided in front of or behind the two lens barrels 1210 and 1220. The third lens barrel 1230 may perform an AF function or a zoom function while moving in the optical axis direction (the Z-axis direction).

Since a space in which the extending portion 1210b or 1220b overlaps other lens barrels in the optical axis direction does not exist in the additionally provided lens barrel 1230, the additionally provided lens barrel 1230 includes a lens seating portion without including the extending portion, that is, the third lens barrel 1230 itself.

The third lens barrel 1230 includes fifth ball bearings 1235, fifth guide grooves 1233, and such other components as described in the first and second lens barrels 1210 and 1220. In the third example of the camera module 1003, the housing 1010 includes sixth guide grooves 1023, and a pulling yoke 1236.

That is, the fifth ball bearings 1235 are interposed between the third lens barrel 1230 and a sidewall of the housing 1010 to serve as sliding or friction bearings. In addition, the third lens barrel 1230 is moved in the optical axis direction (the Z-axis direction) in a state in which it is supported by the sidewall of the housing 1010 by attractive force between the pulling yoke 1236 disposed on the housing 1010 and a magnet 1245a disposed on the third lens barrel 1230.

A coil 1245b is additionally disposed on the main board 1070 and interacts with the magnet 1245a to provide driving force to the third lens barrel 1230 so that the third lens barrel 1230 is moved in the optical axis direction (the Z-axis direction), and a position sensor 1245c disposed on the main board 1070 senses a position of the third lens barrel 1230 in the optical axis direction.

The fifth ball bearings 1235 may be moved in the optical axis direction or may freely rotate in a state in which they are seated in the fifth and sixth guide grooves 1233 and 1023 disposed in the third lens barrel 1230 and the housing 1010, respectively. The housing 1010 includes a through-hole 1020 formed therein so that the coil 1245b and the position sensor 1245c are exposed to an inner portion of the housing 1010.

As illustrated in FIG. 13, the fourth example of the camera module 1004 includes an even number of lens barrels 1210, 1220, 1250, and 1260.

Lens barrel groups disposed in pairs among the lens barrels 1210, 1220, 1250, and 1260 are continuously provided in the optical axis direction (the Z-axis direction) as in the first and second example camera modules 1001 and 1002.

Fourth lens barrel 1250 includes sixth ball bearings 1255, guide grooves 1253 and such other components as described in the first and second lens barrels 1210 and 1220, and the housing 1010 includes guide grooves 1024 and pulling yoke 1256. Fifth lens barrel 1260 includes seventh ball bearings 1265, guide grooves 1263, and such other components as described in the first and second lens barrels 1210 and 1220, and the housing 1010 includes guide grooves 1025 and pulling yoke 1266.

That is, the sixth and seventh ball bearings 1255 and 1265 are interposed between the fourth and fifth lens barrels 1250 and 1260 and a sidewall of the housing 1010, respectively, to serve as sliding or friction bearings. The fourth and fifth lens barrels 1250 and 1260 are movable in the optical axis direction (the Z-axis direction) in a state in which they are supported by the sidewall of the housing 1010 by attractive force between the pulling yokes 1256 and 1266 disposed on the housing 1010 and magnets 1247a and 1249a disposed on the fourth and fifth lens barrels 1250 and 1260, respectively.

Coils 1247b and 1249b for driving the fourth and fifth lens barrels 1250 and 1260 are disposed on the main board 1070 and interact with the magnets 1247a and 1249a, respectively, to provide driving force to the fourth and fifth lens barrels 1250 and 1260, respectively. Thus, the fourth and fifth lens barrels 1250 and 1260 are moved in the optical axis direction (the Z-axis direction). Position sensors 1247c and 1249c disposed on the main board 1070 sense positions of the fourth and fifth lens barrels 1250 and 1260 in the optical axis direction, respectively.

The sixth ball bearings 1255 may be moved in the optical axis direction or may freely rotate in a state in which they are seated in seventh and eighth guide grooves 1253 and 1024 disposed in the fourth lens barrel 1250 and the housing 1010, respectively. The seventh ball bearings 1265 may be moved in the optical axis direction or may freely rotate in a state in which they are seated in ninth and tenth guide grooves 1263 and 1025 disposed in the fifth lens barrel 1260 and the housing 1010, respectively.

The housing 1010 further includes through-holes 1021 and 1022 formed in opposite sidewalls thereof so that the coils 1247b and 1249b and the position sensors 1247c and 1249c are exposed to an inner portion of the housing 1010.

Figure 14:
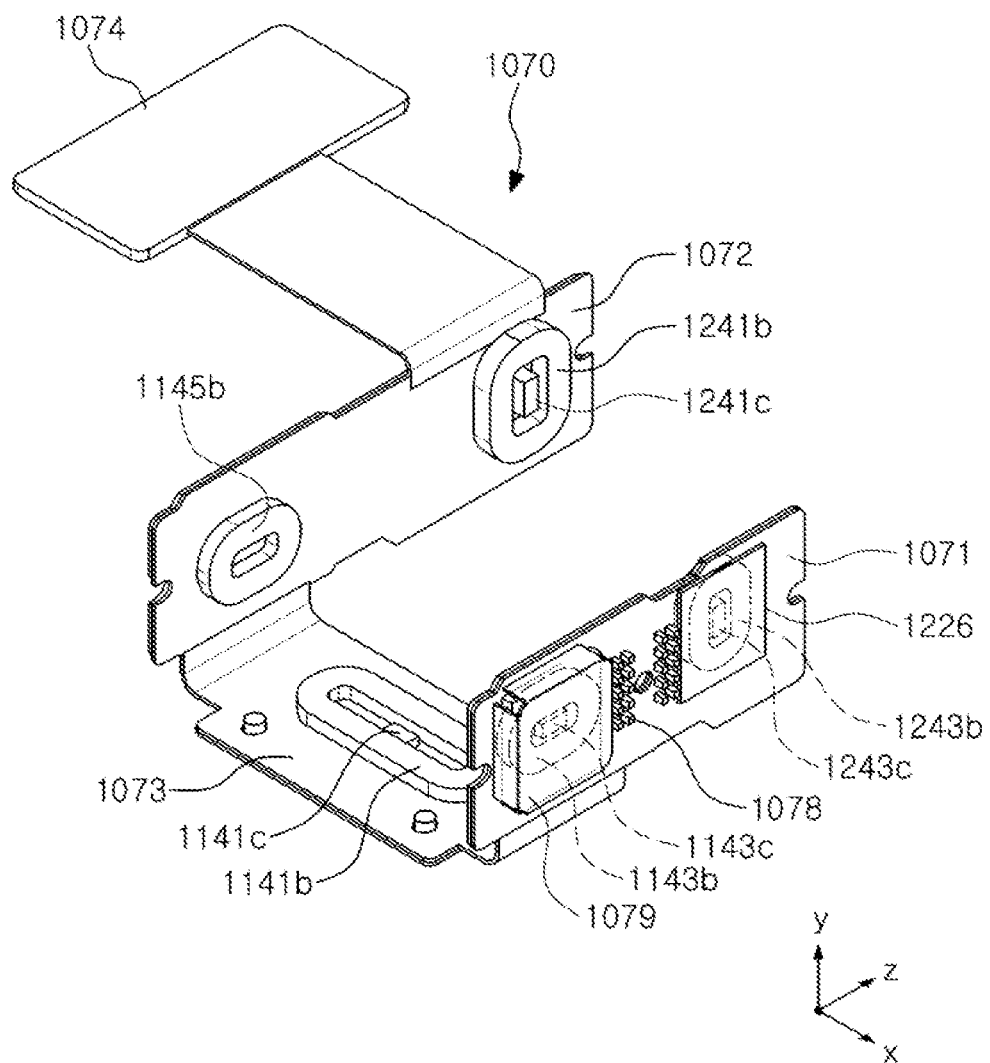
FIG. 14 is a perspective view illustrating an example of a main board, and coils and components mounted on the main board.

FIG. 14 is a perspective view illustrating an example of a main board and coils and components mounted on the main board.

Referring to FIG. 14, the coils 1141b, 1143b, and 1145b of the first driving portion 1140 for driving the reflecting module 1100 and the coils 1241b and 1243b of the second driving portion 1240 for driving the lens module 1200 are mounted on an inner surface of the main board 1070. Components 1078 such as various passive elements, active elements, and the like, and a gyro sensor 1079, and the like, are mounted on an outer surface of the main board 1070. Therefore, the main board 1070 may be a double-sided substrate.

For example, the main board 1070 includes a first side substrate 1071 and a second side substrate 1072 disposed approximately in parallel with each other, a bottom substrate 1073 connecting the first side substrate 1071 and the second side substrate 1072 to each other, and a terminal portion 1074 for connection of an external power supply and a signal, may be connected to any one of the first side substrate 1071, the second side substrate 1072, and the bottom substrate 1073.

Some 1143b (see FIG. 14) of the coils of the first driving portion 1140 for driving the reflecting module 1100 and the position sensor 1143c and some 1243b (see FIG. 14) of the coils of the second driving portion 1240 for driving the lens module 1200 and the position sensor 1243c may be mounted on the first side substrate 1071.

Some 1145b (see FIG. 14) of the coils of the first driving portion 1140 for driving the reflecting module 1100, some 1241b (see FIG. 14) of the coils of the second driving portion 1240 for driving the lens module 1200, and the position sensor 1241c may be mounted on the second side substrate 1702.

The coil 1141b of the first driving portion 1140 for driving the reflecting module 1100 and the position sensor 1141c of the first driving portion 1140 for sensing the position of the reflecting module 1100 are mounted on the bottom substrate 1073.

An example in which the components 1078 such as the various passive elements, active elements, and the like, and the gyro sensor 1079, and the like, are mounted on the first side substrate 1071 is illustrated in the drawing, but the components 1078 such as the various passive elements, active elements, and the like, and the gyro sensor 1079, and the like, may be mounted on the second side substrate 1072 or may be appropriately divided and mounted on the first side substrate 1071 and the second side substrate 1072.

In addition, the coils 1141*b*, 1143*b*, 1145*b*, 1241*b*, and 1243*b* and the position sensors 1141*c*, 1143*c*, 1241*c*, and 1243*c* mounted on the first side substrate 1071, the second side substrate 1072, and the bottom substrate 1073 may be variously divided and mounted on the respective substrates depending on a design of the camera module.

Figure 15:
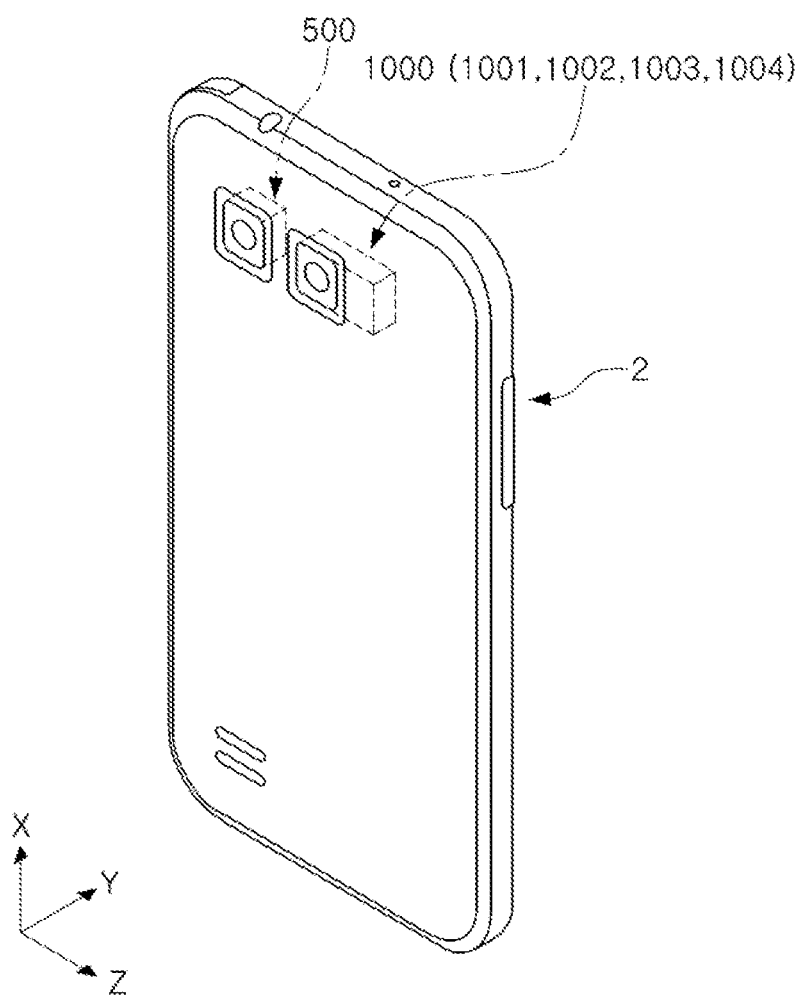
FIG. 15 is a perspective view illustrating a second example of a portable electronic device.

FIG. 15 is a perspective view illustrating a second example of a portable electronic device.

Referring to FIG. 15, the second example of a portable electronic device 2 may be a portable electronic device such as a mobile communications terminal, a smartphone, a tablet personal computer, or the like, in which camera modules 500 and 1000 are mounted.

The camera modules 500 and 1000 are mounted in the portable electronic device 2.

At least one of the camera modules 500 and 1000 is the camera module 1000 according to the example embodiments described above with reference to FIGS. 2 through 13.

That is, the portable electronic device including a dual camera module may include the camera module 1000 according to the example embodiments in the present disclosure as at least one of the two camera modules 500, 1000.

As set forth above, the camera module and the portable electronic device including the same according to the example embodiments in this application have a simple structure and a reduced size while implementing the auto-focusing, zoom, and OIS functions. In addition, power consumption may be significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing comprising an internal space;
   a reflecting module comprising a reflecting member disposed on a movable holder movably supported by an inner wall of the housing disposed in the internal space; and
   a lens module disposed behind the reflecting module in the internal space, and comprising lenses aligned in an optical axis direction so that light reflected by the reflecting member is incident thereto,
   wherein the movable holder is configured to move the reflecting member in a first axis direction approximately perpendicular to the optical axis direction and a second axis direction approximately perpendicular to the optical axis direction and the first axis direction with respect to the housing,
   wherein the lens module comprises first and second lens barrels disposed on the housing, linearly movable in approximately the optical axis direction, and comprising the lenses divided and disposed therein,
   wherein a first ball bearing is disposed between the housing and the first lens barrel, and a second ball bearing is disposed between the housing and the second lens barrel, and
   wherein the first lens barrel comprises a first magnet facing one side surface of the housing, and the second lens barrel comprises a second magnet facing another side surface of the housing.

2. The camera module of claim 1, wherein the first lens barrel and the second lens barrel are sequentially disposed in the optical axis direction.

3. The camera module of claim 2, wherein the first lens barrel and the second lens barrel are aligned approximately in parallel with each other in the optical axis direction.

4. The camera module of claim 1, wherein the first and second magnets are configured to react to coils disposed on the housing configured to generate driving force in the optical axis direction.

5. The camera module of claim 4, wherein a first pulling yoke is disposed on a sidewall of the housing configured to support the first lens barrel by attractive force between the first pulling yoke and the first magnet, and a second pulling yoke is disposed on an opposite sidewall of the housing configured to support the second lens barrel by attractive force between the second pulling yoke and the second magnet.

6. The camera module of claim 1, further comprising first and second guide grooves in which the first and second ball bearings are seated, respectively, disposed in the sidewalls of the housing and the side surfaces of the first and second lens barrels facing each other.

7. The camera module of claim 6, wherein a portion of the first and second guide grooves are elongated in the optical axis direction.

8. The camera module of claim 4, wherein the first magnet is disposed between first ball bearings in the optical axis direction, and the second magnet is disposed between second ball bearings in the optical axis direction.

9. The camera module of claim 2, wherein the first and second lens barrels are approximately the same length as each other in the optical axis direction.

10. The camera module of claim 2, wherein the first and second lens barrels each comprise a lens seating portion and an extending portion extending in the optical axis direction.

11. The camera module of claim 10, wherein the first and second lens barrels each comprise ball bearings disposed in the lens seating portions and the extending portions.

12. The camera module of claim 10, wherein the first and second magnets are disposed in approximately central portions of each lens barrel in the optical axis direction.

13. The camera module of claim 10, wherein the lens seating portion of the first lens barrel and the extending portion of the second lens barrel are disposed overlapping each other in the optical axis direction.

14. The camera module of claim 13, wherein the lens seating portion of the second lens barrel and the extending portion of the first lens barrel are disposed overlapping each other in the optical axis direction.

15. The camera module of claim 1, wherein at least a portion of the lens barrels are configured to selectively implement an autofocusing (AF) function and a zoom function or combine with each other to implement the AF function and the zoom function.

16. A camera module comprising:
a reflecting member disposed in an internal space of a housing, wherein the reflecting member is configured to rotate about first and second axes approximately perpendicular to an optical axis direction, and the reflecting member is configured to reflect light to the optical axis direction;
a lens module disposed in the internal space of the housing, wherein the lens module comprises lenses aligned in the optical axis direction configured to receive the reflected light and be movable in the optical axis direction;
a rotating plate disposed in the internal space on a sidewall of the housing and configured to rotate about the first axis relative to the sidewall; and
a movable holder disposed on the rotating plate in the internal space and configured to rotate about the second axis relative to the rotating plate,
wherein the reflecting member is disposed on the movable holder.

17. The camera module of claim 16, wherein the rotating plate rotates on a first ball bearing disposed between the housing and the rotating plate, and the movable holder rotates on a second ball bearing disposed between the rotating plate and the movable holder.

18. The camera module of claim 16, wherein the lens module comprises a first lens barrel disposed in the internal space on a sidewall of the housing configured to move in the optical axis direction, and a second lens barrel disposed in the internal space on an opposite sidewall of the housing configured to move in the optical axis direction,
wherein a first portion of the lenses are disposed in the first lens barrel and a second portion of the lenses are disposed in the second lens barrel.

19. The camera module of claim 17, wherein the first ball bearing comprises a cylindrical shape extended in the first direction.

20. A camera module, comprising:
a housing comprising an internal space;
a reflecting module comprising a reflecting member disposed on a movable holder movably supported by an inner wall of the housing disposed in the internal space; and
a lens module disposed behind the reflecting module in the internal space, and comprising lenses aligned in an optical axis direction so that light reflected by the reflecting member is incident thereto,
wherein the movable holder is configured to move the reflecting member in a first axis direction approximately perpendicular to the optical axis direction and a second axis direction approximately perpendicular to the optical axis direction and the first axis direction with respect to the housing,
wherein the lens module comprises first and second lens barrels disposed on the housing, linearly movable in approximately the optical axis direction, and comprising the lenses divided and disposed therein,
wherein the first and second lens barrels each comprise a lens seating portion and an extending portion extending in the optical axis direction, and
wherein the lens seating portion of the first lens barrel and the extending portion of the second lens barrel are disposed overlapping each other in the optical axis direction.

21. The camera module of claim 20, wherein the lens seating portion of the second lens barrel and the extending portion of the first lens barrel are disposed overlapping each other in the optical axis direction.

\* \* \* \* \*